United States Patent
Ngan

(10) Patent No.: US 7,088,965 B1
(45) Date of Patent: Aug. 8, 2006

(54) FRACTAL ANTENNA SYSTEM AND METHOD FOR IMPROVED WIRELESS TELECOMMUNICATIONS

(75) Inventor: John Cheong-Wai Ngan, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 587 days.

(21) Appl. No.: 10/041,326

(22) Filed: Jan. 8, 2002

(51) Int. Cl.
*H04B 1/04* (2006.01)

(52) U.S. Cl. .............................. 455/114.2; 455/67.11; 455/115.1

(58) Field of Classification Search ............. 455/562.1, 455/500, 501, 504, 63.1, 63.4, 65, 67.11, 455/67.13, 84, 101, 114.2, 115.1, 115.3, 132, 455/133, 134, 135, 137, 226.1, 226.2, 226.3
See application file for complete search history.

(56) References Cited

U.S. PATENT DOCUMENTS

| | | | | |
|---|---|---|---|---|
| 5,325,403 | A * | 6/1994 | Siwiak et al. | 375/347 |
| 5,383,220 | A * | 1/1995 | Murai | 375/150 |
| 5,581,260 | A * | 12/1996 | Newman | 342/374 |
| 5,999,138 | A * | 12/1999 | Ponce de Leon | 343/745 |
| 6,049,705 | A * | 4/2000 | Xue | 455/277.1 |
| 6,104,349 | A | 8/2000 | Cohen | |
| 6,127,977 | A | 10/2000 | Cohen | |
| 6,140,975 | A | 10/2000 | Cohen | |
| 6,192,038 | B1 * | 2/2001 | Wallerius et al. | 370/328 |
| 6,256,484 | B1 * | 7/2001 | Conner et al. | 455/137 |
| 6,380,896 | B1 * | 4/2002 | Berger et al. | 343/700 MS |
| 6,545,643 | B1 * | 4/2003 | Sward et al. | 343/702 |
| 6,937,677 | B1 * | 8/2005 | Strolle et al. | 375/347 |
| 2001/0046848 | A1 * | 11/2001 | Kenkel | 455/277.1 |
| 2003/0017833 | A1 * | 1/2003 | Forrester | 455/456 |
| 2003/0022648 | A1 * | 1/2003 | Wight | 455/276.1 |
| 2003/0104796 | A1 * | 6/2003 | Yoon | 455/277.2 |

OTHER PUBLICATIONS

Baliarda et al., (May 2000), An Iterative Model for Fractal Antennas: Application to the Sierpinski Gasket Antenna, *IEEE Transactions on Antennas and Propagation*, vol. 48, No. 5, pp. 713-719.

Green et al., (Jul. 2000), Diversity Performance of Dual-Antenna Handsets Near Operator Tissue, *IEEE Transactions on Antennas and Propagation*, vol. 48, No. 7, pp. 1017-1024.

Romeu et al., (Jul. 2000), Fractal FSS: A Novel Dual-Band Frequency Selective Surface, *IEEE Transactions on Antennas and Propagation*, vol. 48, No. 7, pp. 1097-1105.

Baliarda et al., (Nov. 2000), The Koch Monopole: A Small Fractal Antenna, *IEEE Transactions on Antennas and Propagation*, vol. 48, No. 11, pp. 1773-1781.

(Continued)

*Primary Examiner*—Temica Beamer

(57) ABSTRACT

A method and system having one or more fractal antennas for communicating signals. The fractal antennas are coupled to a diversity receive circuit for receiving the signals. The diversity receive circuit provides an output signal based on a combination of the receive signals. The fractal antennas and the diversity receive circuit can help compensate for, or reduce the effects of fading. Additionally, a transmitter provides a transmit signal. One of the fractal antennas may both transmit and receive signals. Alternatively, a transmit antenna, separate from the receive antennas, may transmit the transmit signals. The fractal antennas may also be fractal arrays for providing additional resistance to fading.

23 Claims, 8 Drawing Sheets

OTHER PUBLICATIONS

Fractal Antenna Systems, Inc., www.fractenna.com (printed Jun. 27, 2001).

WSD Oct. 1999-Stubby Antennas Take New Approach, www.fractenna.com/nca_wireless.htm (printed Jun. 27, 2001).

Scientific American: Technology and Business: Wireless Communications: Jul. 1999, www.sciam.com/1999/0799issue/0799techbuss3.html, (printed Jun. 27, 2001).

Cohen et al, (Oct. 1999), Stubby Antennas Take New Approach, *Wireless System Design*, www.fractus.com/produc.htm., (printed Jun. 28, 2001).

Fractal Antenna Systems, Inc., www.fractenna..com/nca_faq.html, (printed Jan. 8, 2002).

* cited by examiner

FRACTAL ANTENNA SYSTEM AND METHOD FOR IMPROVED WIRELESS TELECOMMUNICATIONS

BACKGROUND

1. Field of the Invention

The present invention relates generally to the field of wireless telecommunications and more particularly to wireless telecommunication antenna systems.

2. Description of Related Art

Wireless mobile stations, such as PCS and cellular telephones, WAP-enabled communication devices, personal digital assistants, IEEE 802.11 stations, cordless telephones, pagers, personal digital assistants (PDAs), two-way mobile radios (e.g. FRS-band radios), portable messaging devices (e.g., "Blackberry" devices) and wireless computers, have become widely used in society today. Suitably equipped, such a mobile station may connect a user to a network over an air interface, thereby enabling the user to engage in many useful voice and data communications without the need for a landline connection.

The mobile station will communicate over the air interface with a base station. To facilitate this communication, both the mobile station and the base station will include a respective antenna system. Commonly, a mobile station will employ a whip antenna, and a base station will employ several directional antennas so as to establish a radiation pattern that can encompass the mobile station.

Mobile stations and base stations may communicate with each other over various 20 frequencies. For example, traditional cellular telephones and cellular telephone networks have operated on two frequency bands (the "A" and "B" bands) centered around the 800 or 900 MHz frequency. And as another example, PCS devices and PCS networks have used six frequency bands ("A" through "F") centered around the 1800 or 1900 MHz frequencies. Other wireless communication systems and use of other frequencies for communication between a mobile station and a wireless network are possible as well.

SUMMARY

In accordance with an exemplary embodiment of the present invention, a mobile station and/or base station will use one or more fractal antennas or a fractal array in order to transmit and receive communication signals over the air interface. Each fractal antenna may receive and transmit signals (RF signals) from the air interface and provide the signals for further processing.

If the mobile station or base station employs more than one fractal antenna, each of which provides a respective receive-signal, the fractal antennas may be coupled to a diversity receiver (e.g., a diversity receive circuit), which may function to establish a composite receive signal that is stronger than either of the signals provided from the fractal antennas individually. The diversity receiver may be arranged to combine the signals received from the fractal antennas in any manner, including but not limited to selecting the strongest of the receive-signals.

In one illustrative embodiment, a combiner can be used to combine the signals from the different fractal antennas. The combiner can be a max-ratio combiner for producing an output signal based on a combination of all of the received signals.

Alternatively or additionally, a switch coupled to the fractal antennas may be used to selectively switch the diversity receiver to the fractal antenna that is providing the strongest receive-signal, so that the diversity receiver continually receives the strongest receive-signal.

In addition, the mobile station and/or base station may have a transmitter for sending signals over the air interface. (In this regard, communications from the mobile station to the base station define a "reverse link," and communications from the base station to the mobile station define a "forward link.") In an exemplary embodiment, the transmitter may be coupled to a transmit fractal antenna that is separate from the receive fractal antenna(s).

Alternatively, one of the receive fractal antennas can act as a transmit antenna as well (as a transmit-and-receive fractal antenna), and the other (or another) receive fractal antenna may function as a receive-only fractal antenna. In that case, a bi-directional coupler may link the transmit-and-receive fractal antenna to both the transmitter and the receiver. A combiner may then be coupled to the receive-only fractal antenna and to the bi-directional coupler and may combine the receive signals from the receive-only fractal antenna and from the bi-directional coupler. Alternatively, the combiner may be a duplexer for coupling a transmit-and-receive fractal antenna to both a transmitter and a receiver. Yet another alternative is to use a circulator for coupling the transmit-and-receive antenna into the transmitter and receiver.

These as well as other features and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION

1. Exemplary Architecture

Figure 1:
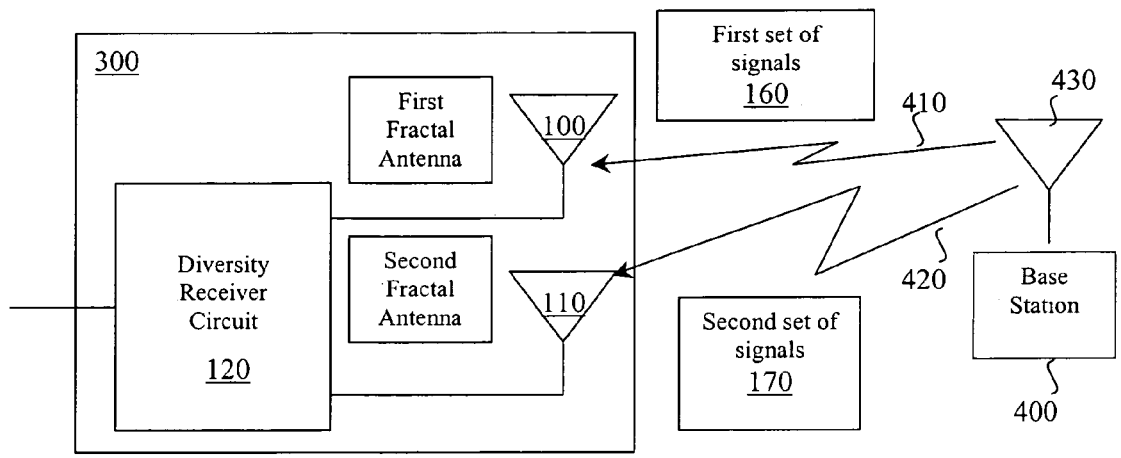
FIG. 1 is a block diagram of a communication system in accordance with an exemplary embodiment.

Referring to the drawings, FIG. 1 is a block diagram of an exemplary communication system. In this regard, it should be understood that many of the elements described and illustrated throughout this specification are functional in nature and may be embodied in one or more physical entities or may take other forms beyond those described or depicted. Alternatively, physical entities may be characterized with an equivalent functional description.

The block diagram shown in FIG. 1 illustrates a communication system with a mobile station transceiver 300 that comprises a first fractal antenna 100 and a second fractal antenna 110 coupled to a diversity receiver circuit 120. A base station 400, in turn, has a base station antenna system 430 for communicating with the first fractal antenna 100 via a communication path 410 (forward link), so that the first fractal antenna 100 can receive a first set of signals 160 (or, equivalently, a first signal 160). Base station antenna system 430 also communicates with second fractal antenna 110 via a communication path 420, so that the second fractal antenna 110 can receive a second set of signals 170.

Figure 2:
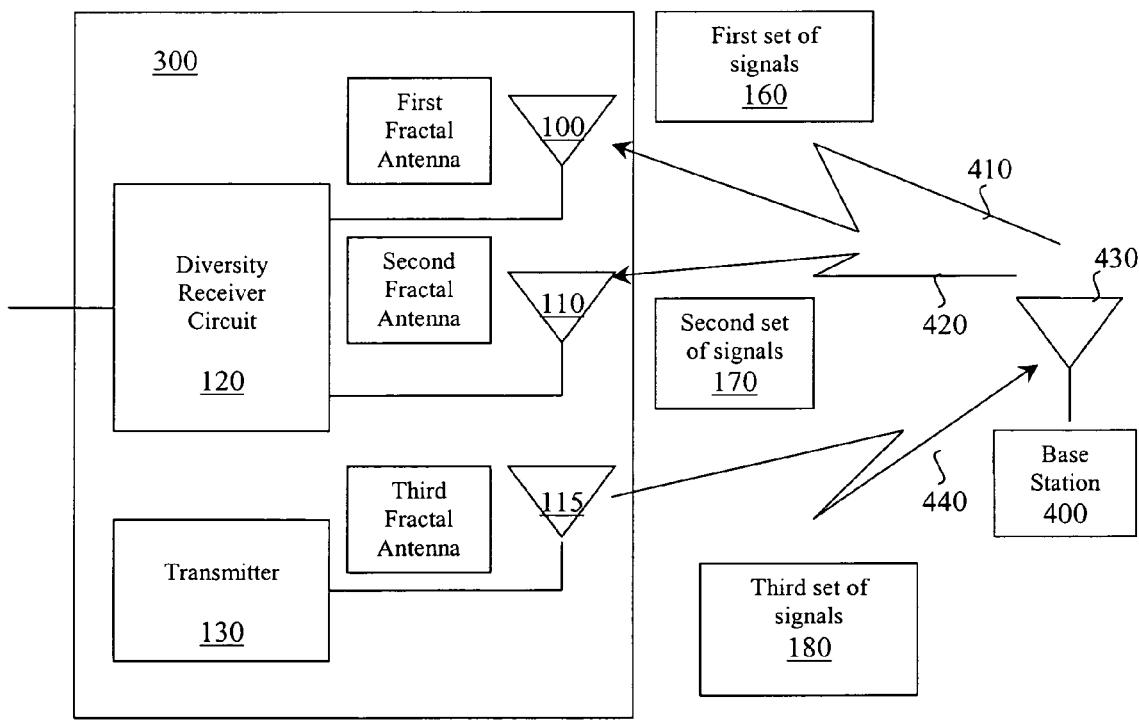
FIG. 2 is a block diagram of a communication system in accordance with an exemplary embodiment.

Referring next to FIG. 2, an alternative system is shown. The system shown in FIG. 2 includes the elements of FIG. 1 with the addition of a third fractal antenna 115 coupled to a transmitter 130 to transmit a third set of signals 180. Base station antenna system 430 communicates with first fractal antenna 100 via communication link 410 and with second fractal antenna 110 via communication link 420, as shown in FIGS. 1 and 2. Further, base station antenna system 430 communicates with the third fractal antenna 115 via communication link 440, so that base station 400 can receive signals from the mobile station.

(Note that in both FIG. 1 and FIG. 2, the reverse is also possible. That is, base station 400 could include a transceiver similar to transceiver 300, including fractal antennas as shown and described.)

Figure 3:
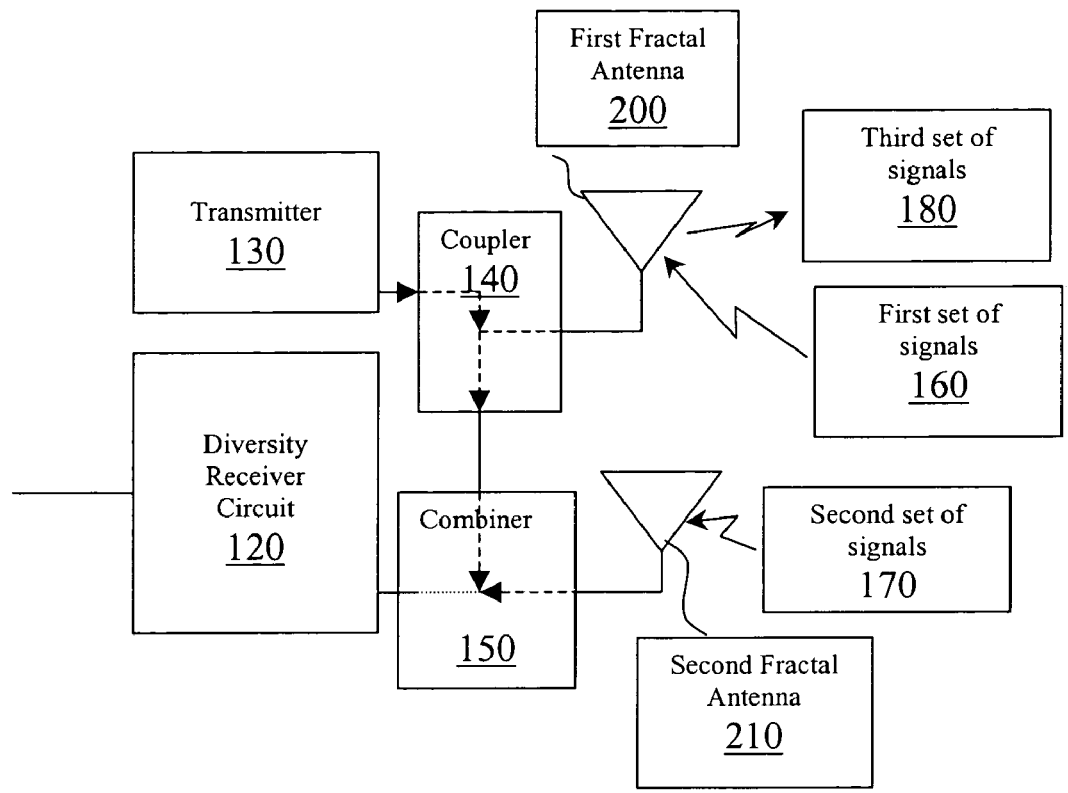
FIG. 3 is a block diagram of a transceiver with two fractal antennas in accordance with an exemplary embodiment.

Referring next to FIG. 3, an illustrative embodiment of the transceiver 300 shown in FIG. 2 can comprise a first fractal antenna 200 and a second fractal antenna 210. The first fractal antenna 200 is shown coupled to a combiner 150 and a transmitter 130 via a coupler 140. And the second fractal antenna 210 is shown coupled to a diversity receiver 120 via a combiner 150. In this arrangement, the first fractal antenna 200 can receive a first set of signals 160 from base station 400 and can transmit the third set of signals 180 to base station 400. And the second fractal antenna 210 can receive the second set of signals 170 from base station 400

Figure 4:
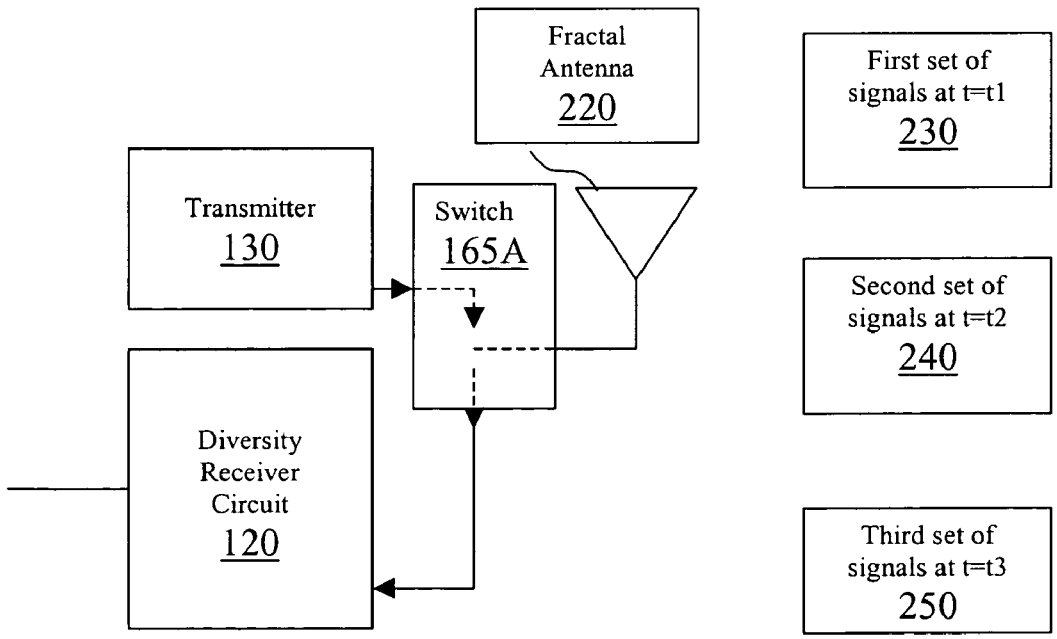
FIG. 4 is a block diagram of a transceiver with a single fractal antenna in accordance with an exemplary embodiment.

FIG. 4 illustrates yet another embodiment of a transceiver, as a modified version of that shown in FIG. 3. In this embodiment, the transceiver includes a fractal antenna 220 that is coupled to transmitter 130 and to diversity receiver 120 via a switch 165, which may function to facilitate communication of different signal sets at different times. For instance, with this arrangement, fractal antenna 220 might receive a first set of signals 230 at a time period $t_1$, might receive a second set of signals 240 at a time period $t_2$, and might transmit a third set of signals 250 at a time period $t_3$. Such an arrangement may be used, for example, in a TDMA (Time Division Multiple Access) communication system where the transmitter 130 periodically transmits and the diversity receiver 120 periodically receives in non-overlapping time periods.

Each fractal antenna may take any of a variety of forms. A fractal antenna will generally have a fractal geometry that is arranged to take advantage of Maxwell's theory of electromagnetism. The fractal geometry may, for instance, comprise random fractals, also known as chaotic or Brownian fractals, which have random noise components or deterministic fractals.

Figure 5:
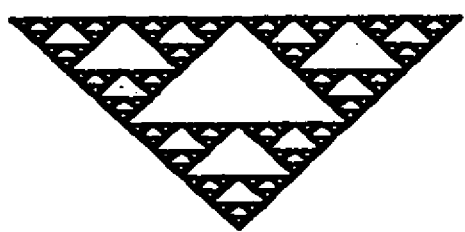
FIG. 5 illustrates an exemplary fractal antenna.
Figure 6:
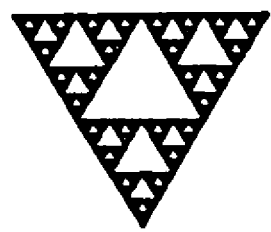
FIG. 6 illustrates another exemplary fractal antenna having a different flare angle.
Figure 7:
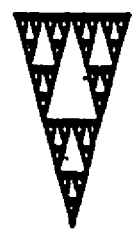
FIG. 7 illustrates an exemplary fractal antenna having yet another flare angle.
Figure 9:
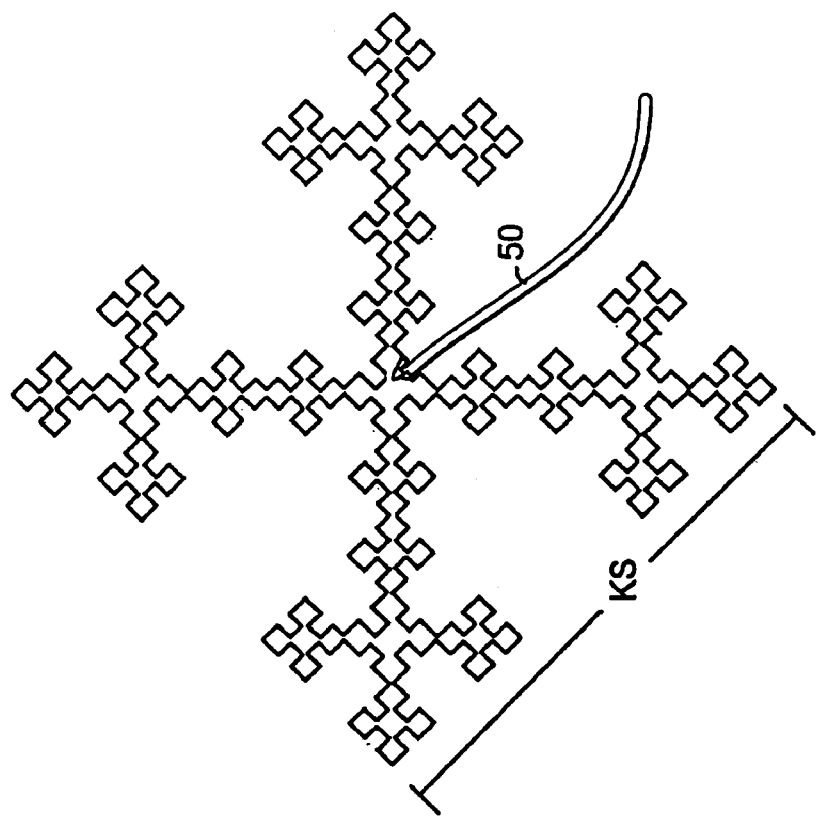
FIG. 9 illustrates an exemplary Minkowski island quad antenna.
Figure 8:
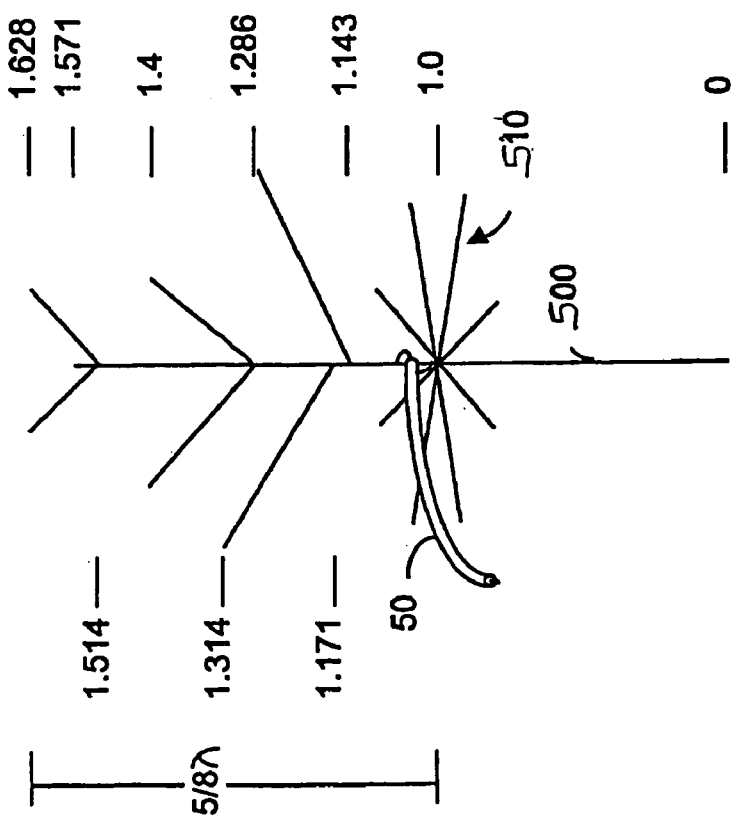
FIG. 8 illustrates an exemplary dendrite fractal antenna.

FIGS. 5 through 9, for instance, illustrate deterministic fractals, each of which uses a self-similar structure from the repetition of a design or motif. In particular, FIGS. 5, 6 and 7 illustrate examples of "Siepinski" fractal antenna designs, as described in "An Iterative Model for Fractal Antennas: Application to the Sirpinski Gasket Antenna", C. Puente; IEEE Transactions on Antennas and Propagation, Vol. 48, No. 5, May 2000, which is incorporated by reference. In particular, FIG. 5 depicts a Siepinski fractal antenna design with a flare angle of 90 degrees, FIG. 6 illustrates a Siepinski fractal antenna with a flare angle of 60 degrees, and FIG. 7 illustrates a Siepinski fractal antenna having a flare angle of 30 degrees. FIG. 8, in turn, illustrates an example of a dendrite fractal antenna, and FIG. 9 illustrates an example of a Minkowski island quad antenna, as described in the patents of Nathan Cohen, U.S. Pat. Nos. 6,104,349, 6,127,977, and 6,140,975, each of which are incorporated by reference.

Since fractal antennas possess a self-similarity in their geometrical structure, multiple resonances occur over an operating bandwidth. As a result, fractal antennas, fractal arrays, and, equivalently, fractal array elements "FAE" of a fractal array exhibit multiband or, alternatively, broadband behavior because the fractal antenna's fundamental geometric design is repeated at many different scales within the antenna structure. Additionally, depending on the particular design, fractal antennas may be physically small due to the relatively compact fractal antenna design. Consequently, fractal geometric concepts may be used to achieve an antenna that has wide-band characteristics in a low profile package.

Thus, for instance, the fractal patterns shown in FIGS. 5 through 9 can be suitably employed in a wireless mobile station and/or base station in accordance with the exemplary embodiment. Further, other fractal antenna patterns now known or later developed may be employed as well.

Further, in place of or in addition to employing a fractal antenna, a transceiver and/or base station can advantageously employ a fractal array. A fractal array is an antenna array in which the array elements are fractal array elements. For example, a mobile station is shown with fractal arrays 310B, 310C in FIG. 10 as described in the patents of Nathan Cohen, U.S. Pat. Nos. 6,104,349, 6,127,977, and 6,140,975 previously incorporated by reference. For additional information on fractal arrays, the reader is directed to U.S. Pat. Nos. 6,104,349, 6,127,977, and 6,140,975.

As such, a fractal array can provide the same benefits as fractal antennas, such as multiband/broadband properties for instance. Further, fractal arrays offer several additional advantages.

For example, fractal arrays may permit the use of recursive algorithms for rapid radiation pattern computations. Additionally, fractal arrays may provide practical low sidelobe and controllable narrow beamwidth radiation patterns. And fractal arrays may also provide the ability to resolve timing and multipath fading. Further, a fractal array may be used to control the direction of a resulting beam.

Figure 10:
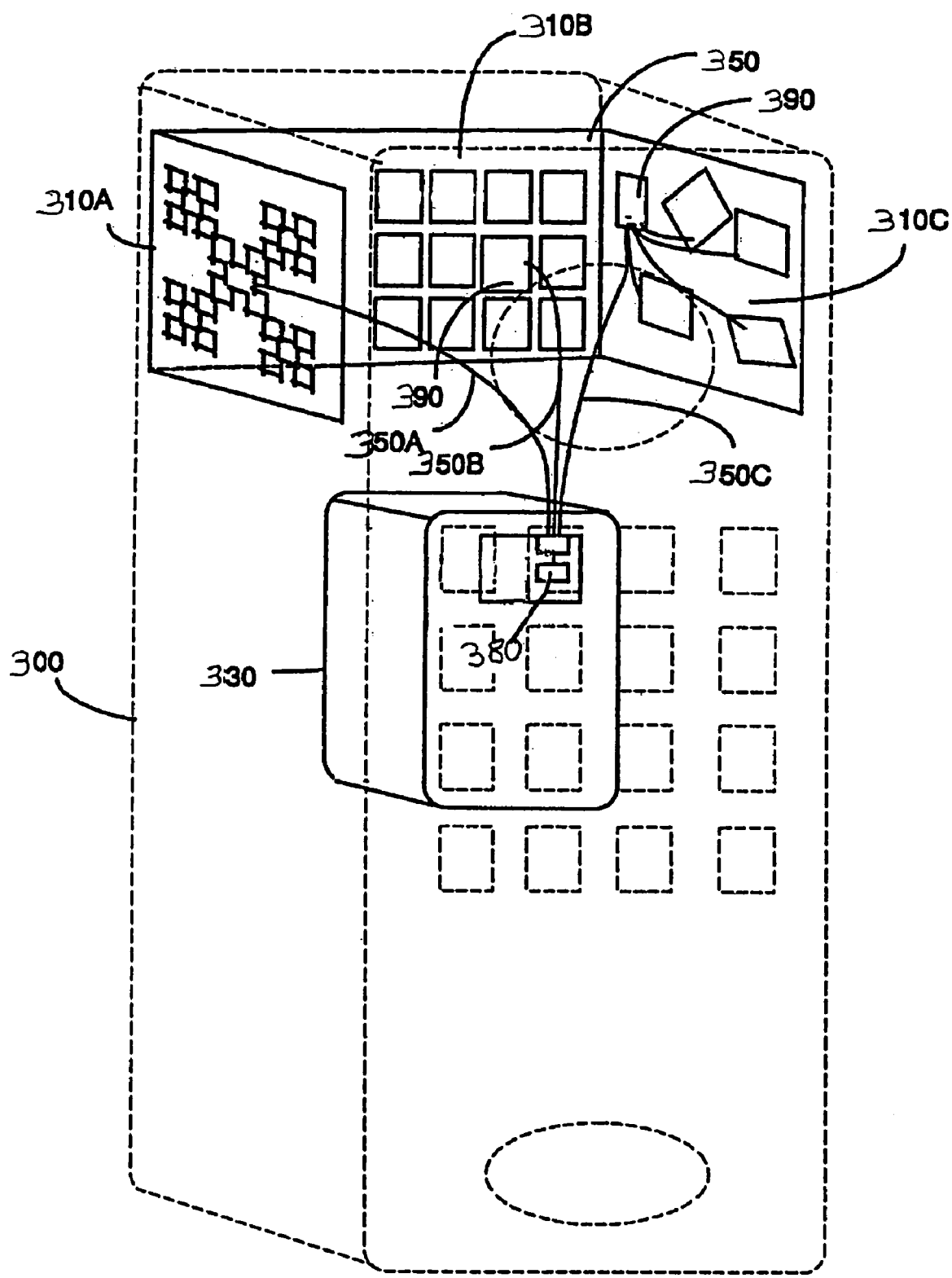
FIG. 10 illustrates an exemplary mobile station with multiple fractal antennas.

An exemplary mobile station transceiver 300 with multiple fractal antennas is shown FIG. 10, to help illustrate how multiple fractal antennas can be implemented within the mobile station transceiver 300 in a thin, compact and efficient design. FIG. 10 shows, for example, the special relationship of a fractal array in the mobile station transceiver 300. For purposes of example, the mobile station transceiver 300 is shown to include a fractal antenna 310A, in combination with one or more fractal arrays 310B, 310C. Fractal antenna 310A may be coupled with receiver 330 via lead 350A. Fractal arrays 310B, 310C maybe made from fractal antenna elements 390 and coupled with receiver 330 via leads 350B, 350C respectively.

Figure 11:
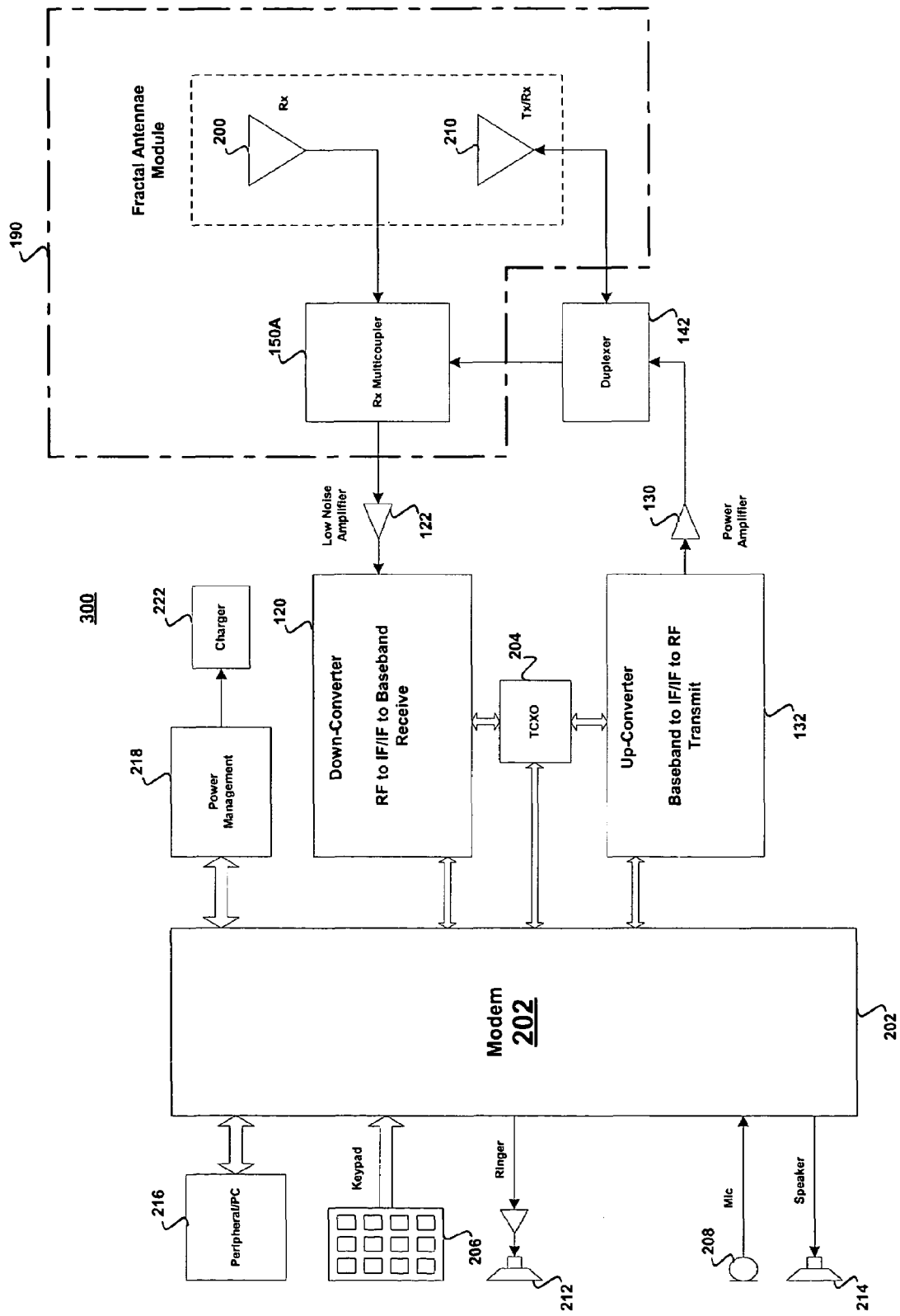
FIG. 11 is a block diagram of a transceiver in accordance with another exemplary embodiment.
Figure 12:
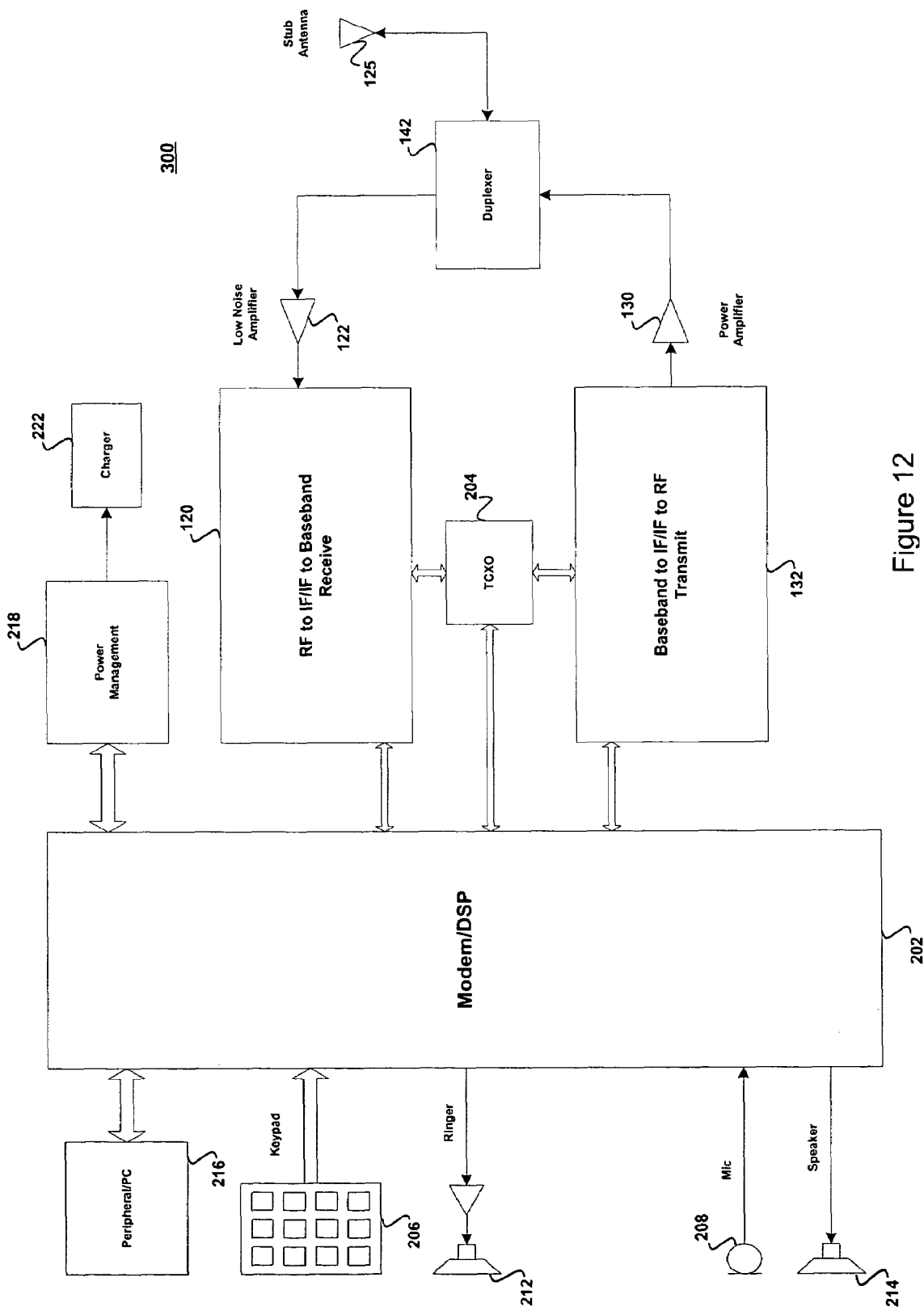
FIG. 12 is a block diagram of a transceiver in accordance with yet another exemplary embodiment.
Figure 13:
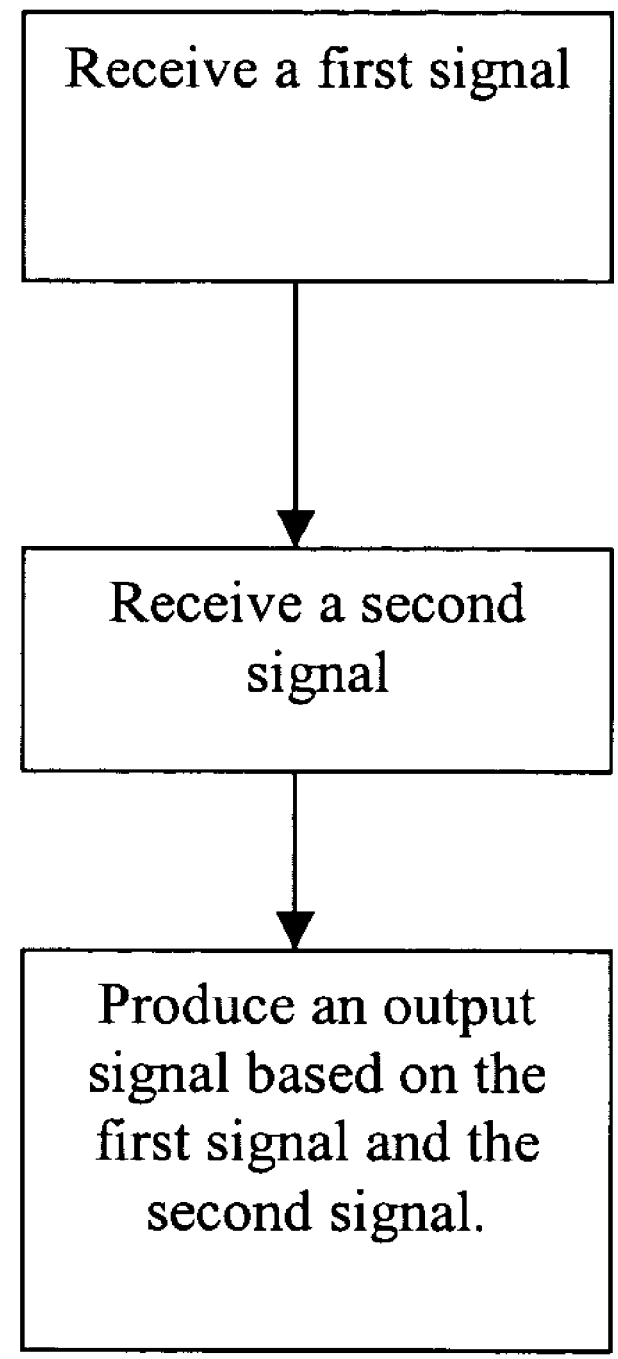
FIG. 13 is a flow chart of a diversity receive method.

FIG. 11 is a block diagram of an exemplary mobile station 300 using a fractal antenna module 190 that is coupled to a modem/processor 202 such as a DSP, via an up-converter 132 and down-converter 120. Fractal antenna module 190 may have one or more fractal antennas such as fractal antennas 200, 210 and a receive multicoupler 150A. Accordingly, the fractal antenna module 190 may easily be added to a mobile station 300 that does not have a fractal antenna such as the exemplary mobile station 300 shown in FIG. 12. FIG. 12 further illustrates antenna 125 coupled to modem/DSP 202 via up-converter 132, down-converter 120, and duplexer 142. FIG. 13 is a flow chart generally illustrating the method of diversity reception. A detailed description of the operation and method of diversity reception is provided below.

2. Exemplary Operation

Fractal antennas can be used to improve communication between a mobile station 300 and base station 400 in a public or private wireless network. The wireless network may take any of a variety of forms. By way of example, the wireless network may be a CDMA network (and/or a cdma2000 or 3G network), such as a Sprint PCS network, or an AMPS, TDMA or GSM network. Alternatively, the network may operate according to the IEEE 802.11b standard. Other examples known now or later developed are also possible.

One of the problems with transmissions in these networks is a phenomenon called fading. In this regard, it is known that fading can arise from various obstructions in the signal paths between the base station 400 and the mobile station 300 transceiver. Additionally, fading may be caused by destructive interference due to intra-system multi-path signals combining at various locations, which may result in the individual multi-path signals effectively canceling or subtracting each other. Fading may also be caused by inter-system multipath interference, on-channel interference, co-channel interference, Rayleigh fading, and intra system interference, or by propagation attenuation variations, path loss, delay-spread, obstructions, diffraction, refraction, and terrain absorption, for example. Other factors affecting fading may be the relative vertical and horizontal antenna height, distance and orientation between the mobile station antenna and the base station antenna. Advantageously, fractal antennas can help compensate for, or reduce, the effects of fading.

Referring to FIG. 2, for instance, mobile station transceiver 300 uses two or more receive fractal antennas (such as 100, 110) to achieve diversity reception. Diversity reception compensates for the effects of pathloss fading and destructive multi-path interference by independently receiving two or more signals 160, 170. Since multipath interference and pathloss fading is usually related directly to the wavelength of the transmitted signal, diversity reception can be achieved by physically separating fractal antennas 100 and 110 in the mobile station transceiver, so as to provide different signal path lengths.

In particular, multipath interference and pathloss fading generally follow a periodic peak (relatively high signal strength) and null (relatively low signal strength) radiation pattern proportional to the wavelength. These radiation patterns may be related to the addition and subtraction of different multipath signals, also known as constructive and destructive interference. For example, a user traveling into a signal null may experience fading due to destructive interference. And a user traveling into a signal peak may receive a relatively strong signal due to constructive interference.

The optimal physical separation between fractal antennas 100, 110, 200, 210, 310A, 310B, 310C may be determined based on a wavelength or fraction of a signal wavelength. Accordingly, if one fractal antenna enters a signal propagation or interference null zone, then statistically, the remaining antenna(s) will not likely be in the null zone. Hence, the antennas may be positioned so that if one antenna is in a signal null, then the other antenna is in a signal peak. For example, the antennas may be spaced apart an integral number of half, quarter, or eighth wavelengths or fractions of a wavelength such as ⅛, ¼, ½, 1½, 2½ wavelengths and so on. Further, the fractal antennas may be configured either physically or electrically such that the signals may be received at wavelengths as discussed or at different phases such as at 45, 90 and 180 degrees.

Since the physical separation of the fractal antennas 100, 110 makes it unlikely that all the antennas will be in a null zone (or relatively weak signal strength) at the same time, diversity receiver 120 may then compensate for multipath interference or pathloss fading. Accordingly, the combination of the diversity receiver 120 and appropriately-separated fractal antennas 100, 110, may provide fading and interference resistance. Thus, transceiver 300 with diversity receiver 120 will experience better quality communication (e.g., fewer dropped calls, etc.) with base station 400. Generally, as the number of diversity receive fractal antennas increase, then the probability of at least one antenna being in a peak zone increases. Since each diversity receive antenna provides a corresponding separate receive signal, the probability that a strong receive signal will be received by the diversity receiver 120 increases as the number of diversity receive fractal antennas increase.

By way of example, the two signals 160, 170 are received by two independent receive fractal antennas 100, 110 (or, as shown in FIG. 3, fractal antennas 200, 210). As stated previously, if one of the two signals (i.e. 160 or 170) suffers from fading or interference, then, statistically, the remaining signal likely will be a stronger signal. Accordingly, diversity receiver 120 may then switch between the two receive signals in order to select the stronger of the two signals to be received. For example, combiner 150 may facilitate switching between the two received signals.

Alternatively, one embodiment of combiner 150 is a max-ratio type of combiner. Accordingly, the diversity receiver 120 may combine the two signals 160, 170, for example, with a maximum-ratio type of combiner 150 in order to provide a combined signal that is stronger than either of the two signals individually.

As discussed above, the transceiver 300 will have a transmitter 130 as shown in FIG. 2 for generating a third set of signals, the transmit signals 180. These signals are then radiated to the base station 400 through a transmit antenna 115 over the reverse link 440. Alternatively, as shown in FIG. 3, the third set of signals 180 may be transmitted by either or both of the two fractal antennas 200, 210. To avoid interference, the mobile station 300 may transmit and receive signals on different frequency bands.

To facilitate transmitting and receiving on a single antenna, such as on second fractal antenna 200, a bi-directional coupler 140 such as a duplexer may be used. In an exemplary embodiment, the duplexer 140 has a transmit-band filter that permits transmit signals 180 to pass from the transmitter 130 through the duplexer 140 to the duplexed antenna 200. Duplexer 140 has a receive-band filter that permits receive signals to pass from the duplexed antenna 200 through the duplexer 140 to the diversity receiver 120.

Since the receive and transmit filters have different frequency bands, isolation is provided between the diversity receiver 120 and the transmitter 130. Isolation between the transmitter 130 and the diversity receiver 120 may also prevent transmit signals from interfering with the diversity receiver 120. Isolation may be provided by the filters in the form of a high impedance because the filters have non-overlapping pass bands. As a result, each filter appears as a high impedance to the other. Alternatively, isolation may be provided by a transmission line coupler so that the receive and transmit ports are at an integral number of half wavelength(s) apart in order to provide a high impedance.

Alternatively, coupler 140 shown in FIG. 3 may be a device such as circulator, or switch as shown in FIG. 4, to permit a single antenna to function as both a transmit and a receive antenna. A circulator is a passive device that allows power to be transferred in one direction thus permitting an antenna to function as both a transmit antenna and a receive antenna.

Since many protocols use digital modulation, the transmit and receive periods may occur at non-overlapping time periods. Accordingly, TDMA protocols such as GSM, IS-54, and IEEE 802.11, for example, permit a single fractal antenna 220 to perform the transmit and receive functions without the need for a separate transmit antenna or a combiner (such as a duplexer). Since the receive and transmit functions may occur in non-overlapping periods of time, or modes, and since two or more non-overlapping receive samples may be made in these systems during the receive period, a single antenna may provide the function of both transmit and receive diversity.

A single antenna 220 may perform both transmit 130 and diversity receive 120 functions through the use of a switch 165A. As shown in FIG. 4, for instance, a switch 165A may be used in place of a duplexer in order to permit a single receive/transmit antenna 220 to be coupled to the diversity receiver 120 when the diversity receiver 120 is in a receive mode. The transmit and receive functions are periodic as described above. For example, the single antenna 220 may be coupled to the transmitter 130 when the transmitter 130 is in a transmit mode. With reference to FIG. 11, in this embodiment, the diversity receiver 120 in cooperation with a modem/processor 202 such as a DSP may operate the diversity receiver 120 to make two or more receive samples at non-overlapping periods of time.

Since the mobile station transceiver 300 is likely moving within the system, different receive samples may be taken at two or more locations. As a result, a single fractal antenna 220 may thus effectively provide two or more different receive signals 230, 240 at the corresponding two or more locations. For example, the processor/modem 202 may store a first receive sampled signal, then max-ratio combine the first receive sampled signal with a second sampled signal. Consequently, the processor/modem 202 may combine the different receive signals to create a combined signal that is stronger than either of the two signals individually.

The single antenna 220 may be coupled to the transmitter 130 when the transmitter 130 is in the transmit mode. Accordingly, the switch 165A may couple the fractal antenna 220 with the transmitter 130 and with the diversity receiver 120 through the use of a pin-diode switch, electronic relay, switching transistor or similar device. Consequently, the single antenna 220 may transmit the third set of signals 250 at a third time period.

As shown in FIGS. 11 and 12, the diversity receiver 120 may also include a down-converter circuit in order to provide a base band signal suitable for processing by a base band processor/modem 202 such as a DSP or a general processor. For example, the down-converter 120 may convert the RF signal to an intermediate frequency (IF) signal for processing by the base band processor/modem 202. Analogously, an up-converter 132 may convert the base band signal to an IF signal and then to an RF signal suitable for amplification by the transmitter 130. As a result, the RF signal may be radiated by the transmit/receive antenna 210. Alternatively, for example, the up-converter 132 may also convert the base band signal from the base band processor/modem 202 directly to an RF signal without using an IF.

Additionally, FIG. 11 illustrates a fractal antenna module 190 comprising a fractal receive antenna 200, a transmit/receive antenna 210, and a receive multicoupler 150A. Accordingly, fractal antenna module 190 may be placed into an existing mobile station 300 or mobile station design in place of an antenna 125 as shown in FIG. 12.

The mobile station 300 may have additional components such as a microphone 208 and a speaker 214 to facilitate functionality as a mobile phone. Additionally, the mobile station 300 may have a keypad 206, ringer 212 and peripheral connection(s) 216 to external devices such as a speakerphone or a personal computer.

The use of fractal antennas and fractal arrays may also be applied to the base station 400. Accordingly, the antenna system 430 at the base station 400 may use the diversity receiver, transmit/receive antenna, fractal antenna elements, fractal array structures and methods of using fractal antennas previously described. These and other elements may be used with the frequency tuning and adjustments to the transceiver appropriate for functioning as a base station at the base station's frequency band.

Exemplary embodiments of the invention have been described above. Those skilled in the art will understand, however, that changes and modifications may be made to these embodiments without departing from the true scope and spirit of the present invention, which is defined by the claims.

For example, a variety of air interface protocols may be used, including CDMA, 3G, and hybrid CDMA/TDMA air interface protocols. Additionally, the standards being developed for future protocols may utilize various hybrid forms of CDMA/TDMA, so these standard and future cellular air interface protocols are contemplated. The claims should not be read as limited to the described order or elements unless stated to that effect.

I claim:

1. A device comprising:
    a first fractal antenna for receiving a first set of signals;
    a second fractal antenna for receiving a second set of signals; and
    a diversity receive circuit coupled to the first fractal antenna for receiving the first set of signals and to the second fractal antenna for receiving the second set of signals, wherein the diversity receive circuit includes a combiner for providing a combiner output signal based on a combination of the first set of signals and the second set of signals, wherein the combiner output signal is stronger than the first set of signals and is stronger than the second set of signals; and
    wherein the first and second fractal antennas are spaced from each other in an optimized manner so as to reduce the likelihood that both antennas are in an interference null zone for signal radiation of an expected wavelength.

2. The device of claim 1, further comprising a transmitter coupled to a third fractal antenna to transmit a third set of signals.

3. The device of claim 1, further comprising a transmitter coupled to the first fractal antenna to transmit a third set of signals on the first fractal antenna.

4. The device of claim 1, wherein the device is a wireless mobile station.

5. The device of claim 1, wherein the device is a base station.

6. The device of claim 1, wherein the first and second fractal antenna are physically separated by approximately an integral number of fractions of a wavelength.

7. The device of claim 1, wherein the diversity receive circuit provides the output signal for the compensation of fading and wherein said fading is caused by an event selected from the group consisting of multipath interference, signal obstruction, terrain absorption, diffraction, and refraction.

8. A device comprising:
a first fractal antenna for receiving a first set of signals;
a second fractal antenna for receiving a second set of signals;
a transmitter for generating a third set of signals;
a bi-directional coupler connected to the first fractal antenna and to the transmitter, wherein the bi-directional coupler receives the first set of signals from the first fractal antenna and transmits the third set of signals from the transmitter to the first fractal antenna;
a combiner connected to the second fractal antenna and to the bi-directional coupler for producing a combiner output signal based on a combination of the first set of signals from the bi-directional coupler and the second set of signals from the second fractal antenna, wherein the combiner output signal is stronger than the first set of signals from the bidirectional coupler and is stronger than the second set of signals from the second fractal antenna;
a receive circuit coupled to the combiner for receiving the combiner output signal; and
wherein the first and second fractal antennas are spaced from each other in an optimized manner so as to reduce the likelihood that both antennas are in an interference null zone for signal radiation of an expected wavelength.

9. The device of claim 8, where the combiner is a max-ratio combiner.

10. The device of claim 8, where the bi-directional coupler is a duplexer comprising:
a receive band-pass filter coupling the first set of signals from the first fractal antenna to the combiner; and
a transmit band-pass filter coupling the third set of signals from the transmitter to the first fractal antenna.

11. The device of claim 8, where the bi-directional coupler comprises a circulator.

12. The device of claim 8, where the bi-directional coupler comprises a switch connected to the first fractal antenna, to the combiner, and to the transmitter, wherein:
the transmitter is coupled to the first fractal antenna to transmit the third set of signals when the transmitter is in a transmit mode,
the first fractal antenna is coupled to the combiner for receiving the first set of signals when the receive circuit is in a receive mode.

13. The device of claim 8, wherein the device is a mobile station.

14. The device of claim 8, wherein the device is a base station.

15. The device of claim 8, wherein the first and second fractal antenna are physically separated by an integral number of fractions of a signal wavelength.

16. A device comprising:
a first fractal antenna for receiving a first set of signals;
a second fractal antenna for receiving a second set of signals;
a diversity receiver circuit coupled to the first fractal antenna to receive the first set of signals and to the second fractal antenna to receive the second set of signals, wherein the diversity receiver circuit includes a combiner for providing an output signal based on a combination of the first set of signals and the second set of signals, wherein the combiner output signal is stronger than the first set of signals and is stronger than the second set of signals;
a down-converter coupled to the diversity receiver circuit for converting the combiner output signal into a base band receive signal;
an up-converter for converting a base band transmit signal to a third set of signals; and
a transmitter coupled to the up-converter, wherein the transmitter is coupled to the first fractal antenna for transmitting the third set of signals on the first fractal antenna; and wherein the first and second fractal antennas are spaced from each other in an optimized manner so as to reduce the likelihood that both antennas are in an interference null zone for signal radiation of an expected wavelength.

17. The device of claim 16, further comprising a processor coupled to the up-converter and to the down-converter for processing the base band receive signal and the base band transmit signal.

18. The device of claim 17, further comprising:
a microphone coupled to the processor for converting voice signals into the base band transmit signal; and
a speaker coupled to the processor for converting the base band receive signal to an audio signal.

19. A device comprising:
a fractal array for receiving a set of RF receive signals and for transmitting a set of RF transmit signals;
a bi-directional coupler connected to the fractal array for receiving the set of RF receive signals and for transmitting the set of RF transmit signals;
a receiver coupled to the bidirectional coupler for receiving the set of RF receive signals, wherein the receiver includes a combiner for providing a combiner output signal based on a combination of RF receive signals within the set of RF receive signals, wherein the combiner output signal is stronger than each of the RF receive signals in the set of RF receive signals;
a transmitter coupled to the bi-directional coupler for transmitting the set of RF transmit signals; and
wherein the fractal array comprises first and second fractal antennas are spaced from each other in an optimized manner so as to reduce the likelihood that both antennas are in an interference null zone for signal radiation of an expected wavelength.

20. A method for receiving a radio frequency signal method comprising:
- using a first fractal antenna to receive a first signal;
- using a second fractal antenna to receive a second signal; and
- using a combiner to produce a combiner output signal that is stronger than the first signal and is stronger than the second signal; and
- wherein the first and second fractal antennas are spaced from each other in an optimized manner so as to reduce the likelihood that both antennas are in an interference null zone for signal radiation of an expected wavelength.

21. The method of claim 20 further comprising transmitting a third signal.

22. The method of claim 21, wherein the first fractal antenna receives the first signal and transmits the third signal.

23. The method of claim 21, wherein a third fractal antenna transmits the third signal.

* * * * *